(12) United States Patent
Yamakawa (10) Patent No.: US 8,646,503 B2
(45) Date of Patent: Feb. 11, 2014

(54) PNEUMATIC TIRE

(75) Inventor: Takahiro Yamakawa, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 13/313,706

(22) Filed: Dec. 7, 2011

(65) Prior Publication Data

US 2012/0152427 A1    Jun. 21, 2012

(30) Foreign Application Priority Data

Dec. 21, 2010 (JP) ................... 2010-284164

(51) Int. Cl.
*B60C 13/00* (2006.01)
*B60C 13/02* (2006.01)

(52) U.S. Cl.
USPC .......................................................... 152/523

(58) Field of Classification Search
USPC ................................................. 152/523–525
See application file for complete search history.

(56) References Cited

FOREIGN PATENT DOCUMENTS

| JP | 11321243 A | * | 11/1999 | ............. B60C 13/00 |
|---|---|---|---|---|
| JP | H11-321243 A | | 11/1999 | |
| JP | 2003025813 A | * | 1/2003 | |
| JP | 2010254088 A | * | 11/2010 | |
| JP | 2011116306 A | * | 6/2011 | |
| WO | WO 2009029088 A1 | * | 3/2009 | |

OTHER PUBLICATIONS

Machine Translation : JP2003-25813; Ota, Shigeki.*
Machine Translation: JP 2011-116306; Iwabuchi, Sotaro.*
Machine Translation: JP 2010-254088; Nukushina, Ryosuke.*
English Summary: JP11-321243; Itabashi, Shinobu.*

* cited by examiner

*Primary Examiner* — Justin Fischer
*Assistant Examiner* — Kendra Shin
(74) *Attorney, Agent, or Firm* — Global IP Counselors (57) ABSTRACT

A pneumatic tire includes a tread portion extending in a tire circumferential direction and a pair of sidewall sections on both sides of the tread portion, respectively, with regard to a tire width direction. At least one of the sidewall sections includes partitions and a plurality of first and second minute regions. The partitions have a prescribed spacing in the tire circumferential direction and extend linearly in a tire radial direction. The first and second minute regions are provided in each of a plurality of partitioned regions and are visually distinguishable from surrounding sidewall surface regions. The first minute regions are also visually distinguishable from the second minute regions. The first and second minute regions are provided alternately along the tire radial direction, and the radial positions of the first minute regions and the second minute regions are varied with respect to the tire circumferential direction.

14 Claims, 8 Drawing Sheets

CIRCUMFERENTIAL DIRECTION OF TIRE

PNEUMATIC TIRE

CROSS-REFERENCE TO RELATED APPLICATIONS

This application claims priority under 35 U.S.C. §119(a) to Japanese Patent Application No. 2010-284164, filed in Japan on Dec. 21, 2010, the entire contents of Japanese Patent Application No. 2010-284164 are hereby incorporated herein by reference.

BACKGROUND

1. Field of the Invention

The present invention relates to a pneumatic tire having a side wall section.

2. Background Information

In recent years, side walls of pneumatic tires are being made with smaller thicknesses (also called "side gauge") in order to reduce weight and lower a rolling resistance. However, when the side gauge is reduced, a side wall surface tends to highly likely to exhibit a poor external appearance. Although the poor external appearance does not have an adverse effect on the durability and the operating performance of the tire, a user may be concerned that the tire may have poor durability and operating performance.

In a forming process that is performed when a tire is manufactured, a sheet-like carcass member is wrapped around a tire forming drum and a wrap starting end and a wrap finishing end are joined such that they partially overlap each other. Consequently, a thickness is larger at the overlapped portion, and this portion ultimately appears as an uneven portion of a sidewall surface of the tire. In a radial tire made using a single carcass member, this uneven portion is conspicuously noticeable.

A known pneumatic tire is described in Japanese Laid-open Patent Publication No. 11-321243. This known tire is configured to prevent an unevenness that exists on a sidewall surface of a tire from being conspicuous. This know tire is also configured to prevent or suppress an occurrence of an external appearance defect at locations adjacent to a cut start and a cut finish resulting from gradual wear of a cutting edge of a cutting tool during formation of a recessed section in a mold. The pneumatic tire has a circular ornamental body on a surface of which are formed a multitude of small semispherical or substantially semispherical protrusions each having a cross sectional width and a height of 0.3 to 2 mm. The protrusions include at least two types of protrusion having different sizes. A bottom surface area of the small protrusions is 2 to 6% the size of a bottom surface area of the large protrusions.

SUMMARY

However, the unevenness that appears on a sidewall surface of the pneumatic tire described in Japanese Laid-open Patent Publication No. 11-321243 may not be sufficiently inconspicuous.

Therefore, an object of the present invention is to provide a pneumatic tire in which an unevenness existing in a sidewall surface can be made sufficiently inconspicuous.

A pneumatic tire according to a disclosed embodiment includes a sidewall section. The sidewall section has partitions, a plurality of first minute regions, and a plurality of second minute regions. The partitions are provided in the sidewall section with a prescribed spacing in-between in a circumferential direction of the tire. The partitions comprise protrusions or grooves extending linearly in a radial direction of the tire. The first minute regions are provided in each of a plurality of partitioned regions of the sidewall surface that are separated from one another along a circumferential direction of the tire by the partitions. Also, the first minute regions are configured to be visually distinguishable from surrounding regions due to a light reflection characteristic or an unevenness of the sidewall surface. The second minute regions are provided in each of the partitioned regions. The second minute regions are configured to be visually distinguishable from the first minute regions due to a light reflection characteristic or an unevenness of the sidewall surface. Also, the second minute regions are arranged adjacently to the first minute regions on inward and outward sides of the first minute regions along a radial direction of the tire. The first minute regions and the second minute regions are provided alternately along a radial direction in each of the partitioned regions.

Positions of the first minute regions along a radial direction of the tire are set such that the first minute regions are partially juxtaposed with first minute regions of the adjacent partitioned regions through the partitions and such that the radial positions vary with respect to a circumferential direction of the tire. Positions of the second minute regions along a radial direction of the tire are set such that the second minute regions are partially juxtaposed with second minute regions of the adjacent partitioned regions and such that the radial positions vary with respect to a circumferential direction of the tire.

It is preferable for a serration process forming a plurality of ridges aligned in one direction to be applied to the first minute regions, the second minute regions, or both the first minute regions and the second minute regions such that the first minute regions are visually distinguishable from the second minute regions. It is preferable for the serration process to be applied to the first minute regions and the second minute regions and for at least one of a density of the ridges, a direction of the ridges, and a width of the ridges to be different on the first minute regions than on the second minute regions.

The partitions separating the partitioned regions are preferably arranged at three or more different angular intervals along a circumferential direction of the tire such that an interval between the partitions varies periodically along a circumference of the tire. Additionally, it is preferable for the variation of the positions of the first minute regions and the second minute regions in a radial direction of the tire to be a periodic variation and for a period and a phase of this periodic variation to match a period and a phase of the periodic variation of the intervals between the partitions.

It is also preferable for the variation of the positions of first minute regions and the second minute regions in a radial direction of the tire to be a periodic variation that complies with a sine wave or a triangular wave. It is further preferable for the variation of the positions of first minute regions and the second minute regions in a radial direction of the tire to be a periodic variation and for a period of the periodic variation to be, for example, 10 to 60 mm along a circumferential direction of the tire. It is also preferable for a width of the partitions to be, for example, 0.5 to 2 mm.

Accordingly, with a pneumatic tire a according to the disclosed embodiments, an unevenness existing in a sidewall surface can be sufficiently obscured.

BRIEF DESCRIPTION OF THE DRAWINGS

FIGS. 4 (a) to (c) are cross sectional views showing a first minute region, a second minute region, and a partition;

FIGS. 5 (a) and (b) illustrate a position variation of the first minute regions in a radial direction of the tire and dimensions of a first minute region;

FIGS. 6 (a) and (b) illustrate minute unevenness formed in a first minute region and a second minute region;

FIGS. 9 (a) and (b) illustrate forms of position variation of the first minute regions and the second minute regions in a radial direction of a tire.

DETAILED DESCRIPTION OF EMBODIMENTS

A pneumatic tire according to disclosed embodiments will now be explained in detail. In the explanations that follow, a "circumferential direction of the tire" corresponds to a direction in which a tread section of the tire rotates when the tread section is rotated about a rotational axis of the tire and a "radial direction of the tire" corresponds to a direction extending radially from the rotational axis of the tire.

Figure 1:
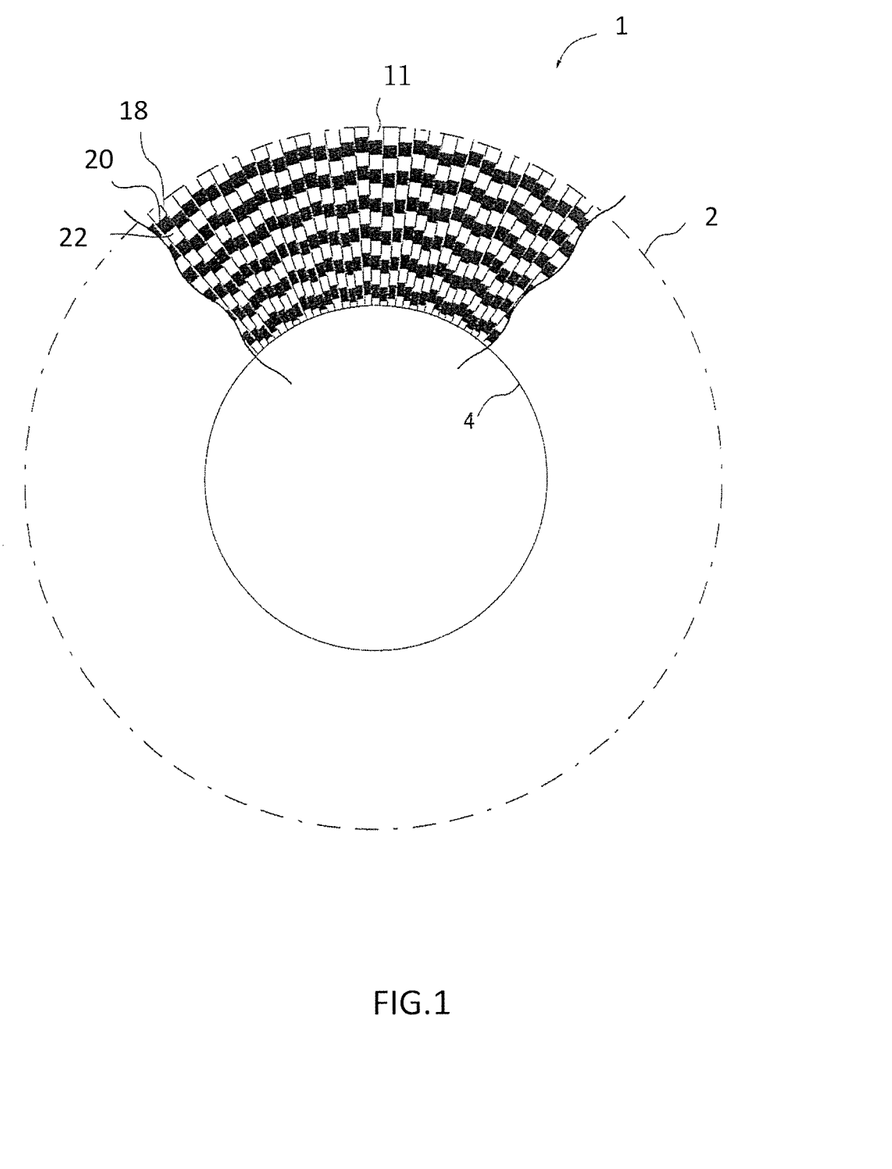
FIG. 1 shows a surface of a sidewall section of a pneumatic tire according to a disclosed embodiment.

FIG. 1 shows a surface of a side wall section 3 (see FIG. 2) of a pneumatic tire (hereinafter called "tire") 1 according to a disclosed embodiment. In FIG. 1, a tread section 2 is represented with a circular arc-shaped single-dot chain line, and a bead section 4 is represented with a circular arc-shaped single-dot chain line.

Figure 2:
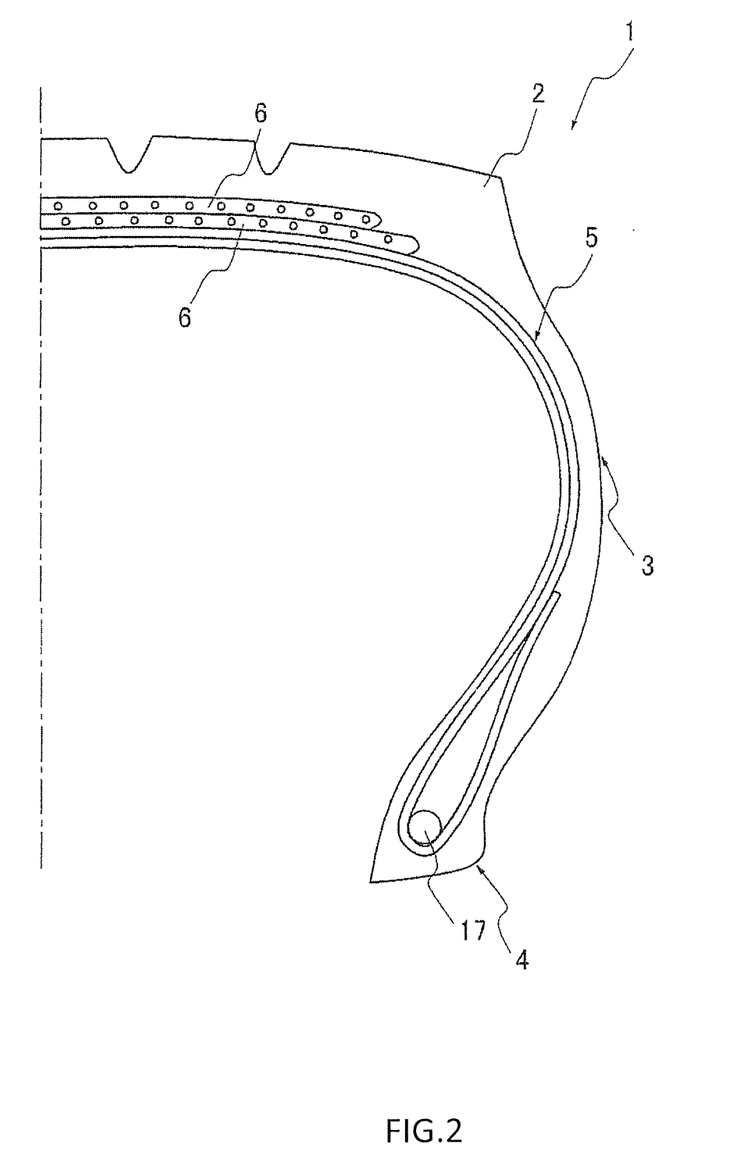
FIG. 2 is a cross sectional view of a half portion of a pneumatic tire shown in FIG. 1.

FIG. 2 is a cross-sectional view showing a half portion of the tire 1. As shown in FIG. 2, the tire 1 has a tread section 2 and a pair of sidewall sections 3 disposed on both sides of the tread portion. The tire 1 further includes a bead section 4, a carcass layer 5, and a belt layer 6. The tire 1 also has an inner liner layer and other parts not shown in the Figures. A sidewall section 3 and a bead section 4 are arranged on each of two opposite sides of the tread section 2 so as to be separated along a widthwise direction of the tire (a tire width direction). Each of the bead sections 4 has a bead core 17. For purposes of this discussion, one sidewall section 3 and one bead section 4 illustrated. However, each of the sidewall sections 3 and bead sections 4 can include the features discussed herein.

A side pattern indicating region 11 shown in FIG. 1 and a marking indicating region (not shown) are provided on a sidewall section 3 along a circumference of the tire 1 (tire circumferential direction). The marking indicating section not shown includes such markings as a product name of the tire, a brand name, a tire manufacturer name, lettering, symbols, and numerals indicating such information as tire size. The side pattern indicating region 11 is contrived to surround a periphery of the marking indicating region. The side pattern indicating region 11 will now be explained. It is acceptable for a side pattern indicating region 11 to be provided on only one of the side wall sections 3 or on both of the side wall sections 3.

Figure 4:
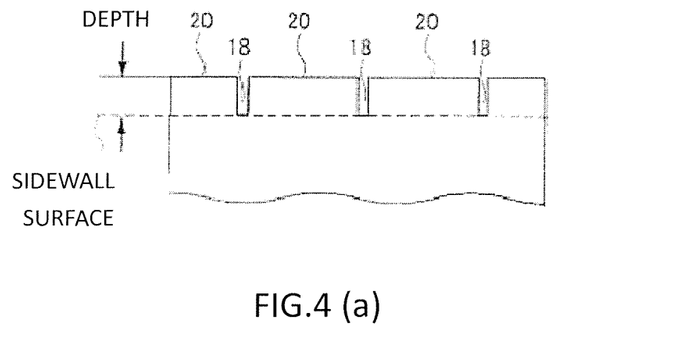

As shown in FIG. 1, a side pattern indicating region 11 provided on a sidewall surface has a plurality of partitions 18, a plurality of first minute regions 20, and a plurality of second minute regions 22. The partitions 18 separate the first minute regions 20 and the second minute regions 22 in a circumferential direction of the tire and comprise grooves or ridges extending linearly in a radial direction of the tire (tire radial direction). The partitions 18 are depicted as straight lines in FIG. 1. The partitions 18 are spaced at a prescribed interval along a circumferential direction of the tire. If the partitions 18 are grooves, then a depth of the grooves is, for example, 0.3 to 3.0 mm (see FIG. 4 (a)). If the partitions 18 are ridges, then a depth from the ridges to the second minute regions 22 is, for example, 0.3 to 3.0 (see FIG. 4 (b)).

Figure 3:
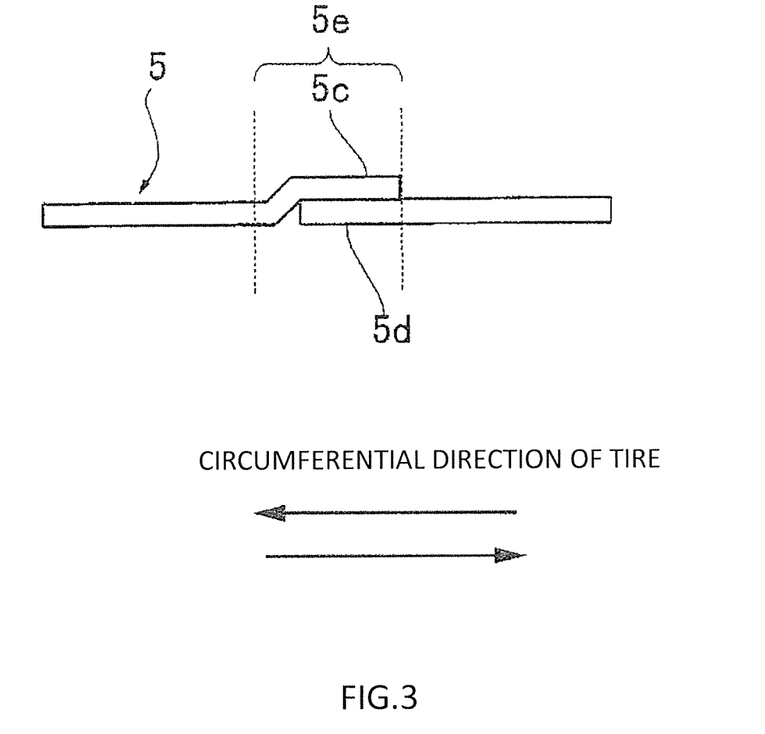
FIG. 3 is a view illustrating an overlap of a carcass member causing an unevenness to appear in a sidewall surface of a tire.

First minute regions 20 and second minute regions 22 are provided in the partitioned regions defined and separated from one another along a circumferential direction of the tire by the partitions 18. The side pattern formed by the partitions 18, the first minute regions 20, and the second minute regions 22 serves to create an optical illusion such that the unevenness that actually exists on a surface of the sidewall inconspicuous when a person looks at the tire. The unevenness occurring on a surface of the sidewall is, for example, aligned along a radial direction of the tire and results from, for example, a step-like portion created by overlapping of a wrap finishing end 5c and a wrap starting end 5d of a carcass layer 5 at a portion 5e as shown in FIG. 3.

FIGS. 4 (a) and (b) show examples of cross sections of the first minute regions 20 and the second minute regions 22. FIGS. 4 (a) and (b) exaggerate the depth of the partitions 18. The partitions 18 between the first minute regions 20 are grooves as shown in FIG. 4 (a), and the partitions 18 between the second minute regions 22 are ridges as shown in FIG. 4 (b). As shown in FIG. 4 (c), there is a drop off from a first minute region 20 to a second minute region 22 or a sharp rise from a second minute region 22 to a first minute region 20 having a distance equal to a sum of the depth shown in FIG. 4 (a) and the depth shown in FIG. 4 (b). The partitions 18 are grooves in places where the first minute regions 20 protrude from the sidewall surface as shown in FIG. 4 (a), and the partitions 18 are ridges in places where the second minute regions 22 recede into the sidewall surface as shown in FIG. 4 (b). As will be explained later, a width of the partitions 18 in a circumferential direction of the tire is preferably set to 0.5 to 2 mm in order to effectively create an optical illusion causing an unevenness that actually exists to be inconspicuous.

The first minute regions 20 are provided in each of the partitioned regions that are formed on the sidewall surface by the partitions 18 and separated along a circumferential direction of the tire. The first minute regions 20 can be visually distinguished from surrounding regions because they project outward by a prescribed amount from the sidewall surface. The second minute regions 22 are provided in each of the partitioned regions separated by the partitions 18 and can be visually distinguished from the first minute regions 20 because they are recessed into the sidewall surface by a prescribed amount. The second minute regions 22 are arranged adjacent to the first minute regions 20 on the radially inward and radially outward sides of the first minute regions 20.

As shown in FIG. 1, first minute regions 20 and second minute regions 22 are arranged alternately along a radial direction of the tire in each of the partitioned regions. The positions of the first minute regions 20 along a radial direction of the tire are set such that the first minute regions 20 are partially juxtaposed with first minute regions 20 in the adjacent partitioned regions through the partitions 18 and such that the radial positions vary with respect to a circumferential direction of the tire. The positions of the second minute regions 22 along a radial direction of the tire are set such that the second minute regions 22 are partially juxtaposed with second minute regions 22 in the adjacent partitioned regions through the partitions 18 and such that the radial positions vary with respect to a circumferential direction of the tire. It is acceptable for the variation to be periodic or not periodic, but it is preferable for the variation to be periodic in order to effectively achieve an optical illusion and make the actually existing unevenness inconspicuous to an observer.

Figure 5:
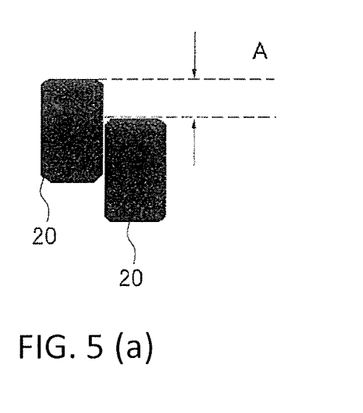

FIGS. 5 (a) and (b) define position variation of the first minute regions 20 in a radial direction of the tire and dimensions of a first minute region 20. First minute regions 20 that are circumferentially adjacent to each other through a partition 18 are offset from each other by a positional offset A in a radial direction of the tire (see FIG. 5 (a)). From the perspective of effectively producing an optical illusion, the positional offset is preferably 0.1 to 0.9 times a radial-direction dimension H of a first minute region 20 (see FIG. 5 (b)). Since the second minute regions 22 are provided alternately with the first minute regions 20, the positional offset of the second minute regions 22 in a radial direction of the tire is also 0.1 to 0.9 times the dimension H of the first minute regions 20. From the perspective of effectively producing an optical illusion, the width W (see FIG. 5 (b)) of the first minute regions 20 in a circumferential direction of the tire is preferably smaller than the dimension H. A width of the partitions 18 is considerably smaller than the width W of the first minute regions 20 and, from the perspective of effectively producing an optical illusion, is preferably from 1/20 to 1/10 times the width W.

Figure 6:
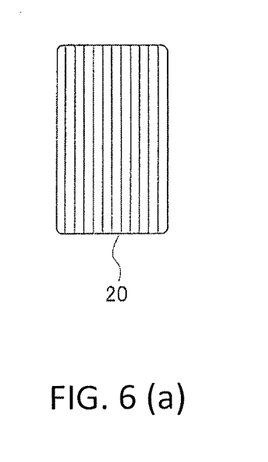

FIGS. 6 (a) and (b) illustrate preferred forms of the surfaces of the first minute regions 20 and the second minute regions 22. Although the first minute regions 20 project outward from the sidewall surface and the second minute regions 22 are recessed into the sidewall surface, it is acceptable for surfaces of the first minute regions 20 and the second minute regions 22 be finely roughened surfaces treated with a serration process serving to form a plurality of ridges aligned in one direction. In such a case, it is preferable for the ridges formed by the serration process on the first minute regions 20 to have a different density that the ridges formed on the second minute regions 22. In this embodiment, the density of the ridges on the first minute regions 20 is higher than the density of the ridges on the second minute regions 22. As a result, light incident on a surface of the first minute regions 20 is diffused and reflected. Thus, an amount of light entering an observer's field of view after being diffused and reflected by the first minute regions 20 is smaller than an amount of light entering the observer's eye from the second minute regions 22. Consequently, the first minute regions 20 appear darker than the second minute regions 22 and can be effectively made to be visually distinguishable from the second minute regions 22. The density of the ridges on the first minute regions 20 is, for example, 1 to 2 ridges/mm, and the density of the ridges on the second minute regions 22 is 0.4 to 0.8 ridge/mm. It is also acceptable for the ridge density of the first minute regions 20 to be smaller and the ridge density of the second minute regions 22 to be larger. Additionally, the regions can be made visually distinguishable by making at least one of a density of the ridges, a direction of the ridges, and a width of the ridges to be different for the first minute regions 20 than for the second minute regions 22. Furthermore, by providing a large number of ridges, it is more difficult for trapped air to occur during a vulcanization process when the tire is manufactured and, thus, the occurrence of external appearance defects can be reduced.

It is acceptable if both the first minute regions 20 and the second minute regions 22 have finely roughened surfaces treated with a serration process, or if only the one are treated with a serration process and the other have a smooth surface that has not been treated with a serration process. It is also acceptable if neither the first minute regions 20 nor the second minute regions 22 are treated with a serration process. Although in this embodiment the first minute regions 20 and the second minute regions 22 comprise recessions and protrusions formed in a sidewall surface, it is also possible to form first minute regions 20 and second minute regions 22 that are visually distinguishable by applying different serration processes resulting in different light reflection characteristics. Instead of utilizing a difference in reflection caused by diffusion and reflection, a difference of reflection characteristics can also be achieved with a difference in reflection direction. For example, the first minute regions 20 and the second minute regions 22 can be configured to have flat surfaces that are slanted at different directions.

Figure 7:
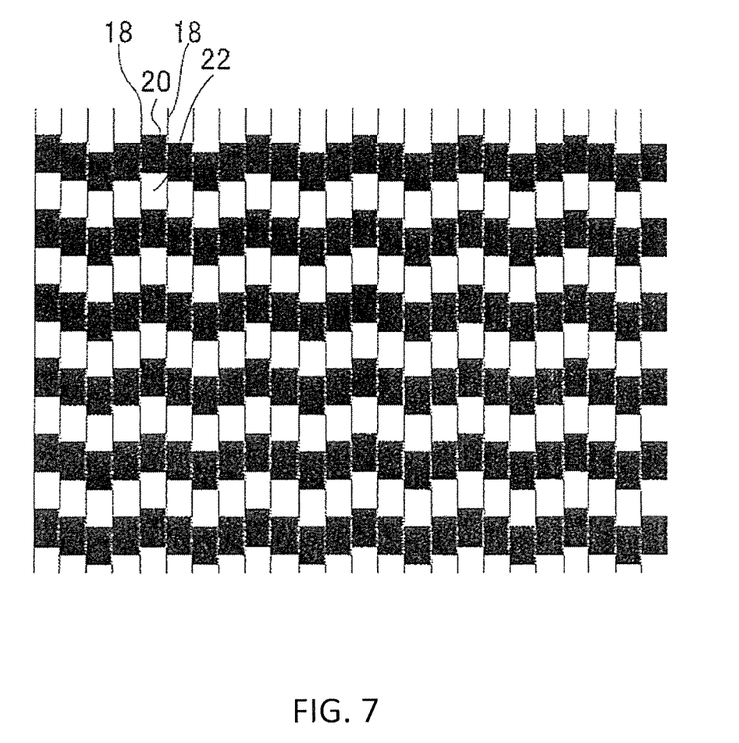
FIG. 7 illustrates a side pattern of a sidewall surface spread out in a linear form according to a disclosed embodiment.

FIG. 7 depicts a side pattern of a sidewall surface according to an embodiment as spread out in a linear form. The side pattern is made up of first minute regions 20, second minute regions 22, and partitions 18. Adjacent partitions 18 are separated by equal intervals. However, although the partitions 18 are separated by equal intervals, the intervals between the partitions 18 appear to vary such that the partitions 18 are not parallel as shown in FIG. 7. This appearance is caused by the optical illusion effect. Thus, when this pattern is formed on a sidewall surface of a tire 1 as shown in FIG. 1, an unevenness actually existing on the sidewall surface is not conspicuous to a person viewing the sidewall surface of the tire 1 due to an optical illusion effect that causes the partitions 18 to appear skewed with respect to a radial direction of the tire.

Figure 8:
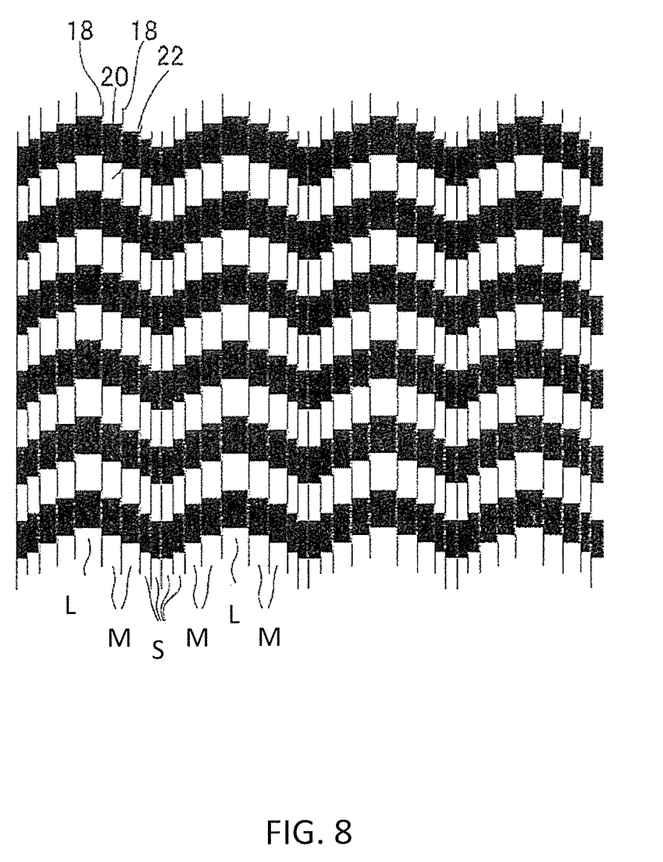
FIG. 8 illustrates a side pattern of a sidewall surface spread out in a linear form according to another embodiment.

FIG. 8 depicts a side pattern of a sidewall surface of a tire 1 according to another embodiment. FIG. 8 depicts the side pattern made up of first minute regions 20, second minute regions 22, and partitions 18 as spread out in a linear form.

The constituent features of a tire 1 according to this embodiment are the same as of a tire 1 according to the embodiment shown in FIG. 2 except that in this embodiment the interval between the partitions 18 varies along a circumference of the tire and, likewise, the widths of the first minute regions 20 and the second minute regions 22 also vary. Therefore, the intervals between the partitions 18 will now be explained. While in the embodiment shown in FIG. 7 the partitions 18 are spaced at equal intervals (i.e., equal at the same position in a radial direction of the tire), in the embodiment shown in FIG. 8 the intervals between the partitions 18 vary in a periodic manner along a circumference of the tire (i.e., the interval varies in a periodic manner at the same position in a radial direction of the tire) such that the partitions 18 are arranged at least three different angular intervals along a circumferential direction of the tire.

In FIG. 8, there are three sizes of interval between the partitions 18: small (S), medium (M) and large (L). The intervals vary discretely and periodically from large to medium, from medium to small, from small to medium, from medium to large, etc. The period and phase of this periodic variation are the same as the period and phase of the periodic variation of the radial positions of the first minute regions 20 and the second minute regions 22 with respect to a circumferential direction of the tire. That is, the first minute regions 20 and the second minute regions 22 are arranged at most outward positions or most inward positions in a radial direction of the tire when the interval between partitions 18 is large, and the first minute regions 20 and the second minute regions 22 are arranged at most inward positions or most outward positions in a radial direction of the tire when the interval between partitions 18 is small. Thus, the side pattern shown in FIG. 8 achieves an optical illusion effect that makes the sidewall surface appear as though it undulates in a three-dimensional manner such that it has periodic protrusions and recesses. Consequently, due to the optical illusion, a person observing the sidewall surface of a tire having this pattern formed on the sidewall surface will not notice the actual unevenness existing on the sidewall surface.

Although the embodiment shown in FIG. 8 uses three different interval sizes between the partitions 18, i.e., small, medium, and large, it is acceptable to use four or more interval sizes. From the perspective of effectively producing an optical illusion, it is preferable to use four to eight interval sizes. In the embodiment shown in FIG. 8, the periodic variation of the intervals between the partitions 18 and the periodic variation of the radial positions of the first minute regions 20 and the second minute regions 22 with respect to the circumferential direction of the tire are in phase with each other and have the same period. Although it is acceptable if the period and phase of these periodic variations are not the same, it is preferable for these periodic variations to be in phase and have the same period in order to effectively achieve an optical illusion.

Figure 9:
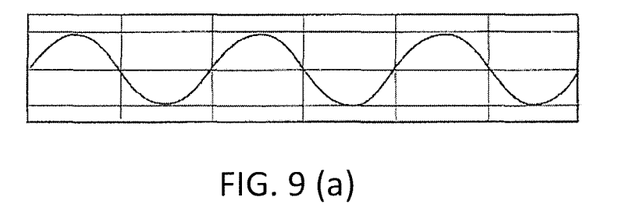

From the perspective of effectively achieving an optical illusion, it is preferable for the variation of the radial positions of the first minute regions 20 and the second minute regions 22 to be periodic variations conforming to a sine wave or a triangular wave as shown in, for example, FIGS. 9 (a) and (b). From the perspective of obscuring an unevenness having a width of 4 to 5 mm that actually exists due to a portion 5e where a carcass layer 5 overlaps, it is preferable for the phase of the aforementioned variations to be from 10 to 60 mm along a circumferential direction of the tire.

WORKING EXAMPLE

In order to investigate the effects of the embodiments, a number of tires 1 like that shown in FIG. 2 (tire size: 145R126PR) were fabricated with different types of side patterns formed on a sidewall surface. One hundred people observed each of the fabricated tires and evaluated a visibility of an unevenness (hereinafter called "BPS splice unevenness") actually existing on a sidewall surface at a portion 5e where a carcass layer 5 overlaps itself.

The results of the evaluations are expressed using the following evaluation point system.

110 points: At least 95% of the observers were not able to clearly recognize the BPS splice unevenness.

108 points: At least 90% but fewer than 95% of the observers were not able to clearly recognize the BPS splice unevenness.

106 points: At least 80% but fewer than 90% of the observers were not able to clearly recognize the BPS splice unevenness.

104 points: At least 70% but fewer than 80% of the observers were not able to clearly recognize the BPS splice unevenness.

102 points: At least 60% but fewer than 70% of the observers were not able to clearly recognize the BPS splice unevenness.

100 points: At least 50% but fewer than 60% of the observers were not able to clearly recognize the BPS splice unevenness.

97 points: Fewer than 50% of the observers were not able to clearly recognize the BPS splice unevenness.

The types of sidewall surfaces used in the evaluations and the evaluation result obtained for each type are shown in the table below. A tire not having a side pattern indicating region was used as an example of the prior art. A comparative example and Working Examples 1 to 5 were each configured such that the partitions 18 had a width-to-depth ratio of 0.07. In the comparative example and the working examples 1 to 5, the radial positions of the first minute regions 20 and the second minute regions 22 are varied periodically with respect to a circumferential direction of the tire in accordance with a sinusoidal waveform. In the Working Examples 1 to 5, radial positions of the first minute regions 20 along a radial direction of the tire are set such that the first minute regions 20 are partially juxtaposed with first minute regions 20 of the adjacent partitioned regions through the partitions 18 and such that the radial positions vary with respect to a circumferential direction of the tire. Similarly, radial positions of the second minute regions 22 along a radial direction of the tire are set such that the second minute regions 22 are partially juxtaposed with second minute regions 22 of the adjacent partitioned regions through the partitions 18 and such that the radial positions vary with respect to a circumferential direction of the tire. The period of the variation of the radial positions of the first minute regions 20 and the second minute regions 22 is 72 mm. The values presented in the table for the length H, the width W, the ratio of interval sizes between adjacent partitions 18, and the period are values obtained at a radial position of the tire where a tire width is largest. For the offset amount A, the largest offset amount along the sine wave was used.

TABLE 1

|  | Prior Art | Comparative Example | Working Example 1 | Working Example 2 | Working Example 3 | Working Example 4 | Working Example 5 |
|---|---|---|---|---|---|---|---|
| First minute regions and second minute regions provided | None | Yes | ← | ← | ← | ← | ← |
| Length H/width W | — | 2 | ← | ← | ← | ← | ← |
| Depth of first minute regions and second minute regions (mm) | — | 1 | ← | ← | ← | ← | ← |
| Offset amount A/length H | — | 0.3 | ← | ← | ← | ← | ← |
| Serrations provided | — | None | None | Yes, two types | ← | ← | ← |
| Partitions 18 provided | — | None | Yes | ← | ← | ← | ← |
| Number of interval sizes between partitions 18 | — | — | 1 | ← | 5 | ← | ← |
| Ratio of interval sizes of adjacent partitions | — | — | 1 | ← | 1.2 | ← | ← |
| Form of partition width variation | — | — | — | — | Triangular | Sinusoidal | ← |
| Period of partition width variation (mm) | — | — | — | — | 72 | ← | 40 |
| Evaluation Points | 100 | 100 | 102 | 104 | 106 | 108 | 110 |

Comparing the prior art, the comparative example, and Working Example 1, it can be seen that the evaluation result is improved by providing first minute regions 20 and second minute regions 22 alternately along radial directions of the tire in the regions defined by the partitions 18 and varying the radial positions of the first minute regions 20 and the second minute regions 22 periodically with respect to a circumferential direction of the tire. This improvement is due to the optical illusion effect obtained with the side pattern comprising the first minute regions 20 and second minute regions 22 separated by the partitions 18.

Comparing the Working Examples 1 and 2 demonstrates that applying a serration process improves the evaluation result. Furthermore, as demonstrated with Working Examples 3 and 4, varying the size of the intervals between the partitions 18 improves the evaluation result. Working Example 5 further demonstrates that setting the period of the interval variation of the partitions 18 to a value in the range of 10 to 60 mm improves the evaluation results.

Although a pneumatic tire according to the present invention has been explained in detail, the present invention is not limited to the previously explained embodiment and various improvements and modifications can clearly be made without departing from the scope of the invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "outboard", inboard", "forward", "rearward", "above", "downward", "vertical", "horizontal", "below" and "transverse" as well as any other similar directional terms refer to those directions of a pneumatic tire according to the present invention. Accordingly, these terms, as utilized to describe the present invention should be interpreted relative to a pneumatic tire according to the present invention. The terms of degree such as "generally", "substantially", "about" and "approximately" as used herein mean a reasonable amount of deviation of the modified term such that the end result is not significantly changed. For example, two members that are angled less than ten degrees apart would be considered "generally perpendicular", but two members that are angled more than fifteen degrees apart would not be considered "generally perpendicular".

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A pneumatic tire comprising:
a tread portion extending in a tire circumferential direction;
a pair of sidewall sections disposed on both sides of the tread portion, respectively, with regard to a tire width direction, at least one of the sidewall sections including
a plurality of partitions comprising protrusions or grooves that are provided at a sidewall surface such that they are spaced apart in the tire circumferential direction and extend linearly in a tire radial direction to form partitioned regions at the sidewall surface;
a plurality of first minute regions that are provided in each of the partitioned regions of the sidewall surface and separated from one another along the tire circumferential direction by the partitions, and visually distinguishable from surrounding regions of the sidewall surface due to a light reflection characteristic or an unevenness of the sidewall surface; and
a plurality of second minute regions that are provided in the partitioned regions, visually distinguishable from the first minute regions due to a light reflection characteristic or an unevenness of the sidewall surface, and arranged adjacently to the first minute regions on inward and outward sides of the first minute regions along the tire radial direction;
the first minute regions and the second minute regions being provided alternately along the tire radial direction in each of the partitioned regions;
the first minute regions are positioned along the tire radial direction such that the first minute regions of adjacent ones of the partitioned regions are partially juxtaposed and positions of the first minute regions in the tire radial direction vary along the tire circumferential direction;
the second minute regions are positioned along the tire radial direction such that the second minute regions of adjacent ones of the partitioned regions are partially juxtaposed and positions of the second minute regions in the tire radial direction vary along the tire circumferential direction; and
each of the first minute regions and the second minute regions includes a plurality of ridges aligned in one direction, such that the first minute regions are visually distinguishable from the second minute regions, and at least one of a density of the ridges, a direction of the ridges, and a width of the ridges of the first minute regions is different than those of the second minute regions.

2. The pneumatic tire according to claim 1, wherein
the positions of first minute regions and the second minute regions in the tire radial direction vary according to a sine wave periodic variation or a triangular wave periodic variation.

3. The pneumatic tire according to claim 1, wherein
the positions of first minute regions and the second minute regions in the tire radial direction vary according to a periodic variation having a period within a range of 10 mm to 60 mm along the tire circumferential direction.

4. The pneumatic tire according to claim 1, wherein
the partitions separating the partitioned regions are arranged at three or more different angular intervals along the tire circumferential direction such that an interval between the partitions varies periodically along the tire circumferential direction.

5. The pneumatic tire according to claim 4, wherein
the positions of the first minute regions and the second minute regions are varied in a periodic variation in the tire radial direction such that a period and a phase of the periodic variation match a period and a phase of a periodic variation of the interval between the partitions;
the periodic variation in the tire radial direction is a sine wave periodic variation or a triangular wave periodic variation;
the periodic variation in the tire radial direction has a period within a range of 10 mm to 60 mm along the tire circumferential direction; and
a width of each of the partitions is within a range of 1.5 mm to 2 mm.

6. The pneumatic tire according to claim 1, wherein
a width of each of the partitions is within a range of 1.5 mm to 2 mm.

7. A pneumatic tire comprising:
a tread portion extending in a tire circumferential direction;
a pair of sidewall sections disposed on both sides of the tread portion, respectively, with regard to a tire width direction, at least one of the sidewall sections including
a plurality of partitions comprising protrusions or grooves that are provided at a sidewall surface such that they are spaced apart in the tire circumferential direction and extend linearly in a tire radial direction to form partitioned regions at the sidewall surface, a width of each of the partitions being within a range of 1.5 mm to 2 mm;
a plurality of first minute regions that are provided in each of the partitioned regions of the sidewall surface and separated from one another along the tire circumferential direction by the partitions, and visually distinguishable from surrounding regions of the sidewall surface due to a light reflection characteristic or an unevenness of the sidewall surface; and
a plurality of second minute regions that are provided in the partitioned regions, visually distinguishable from the first minute regions due to a light reflection characteristic or an unevenness of the sidewall surface, and arranged adjacently to the first minute regions on inward and outward sides of the first minute regions along the tire radial direction;
the first minute regions and the second minute regions being provided alternately along the tire radial direction in each of the partitioned regions;
the first minute regions are positioned along the tire radial direction such that the first minute regions of adjacent ones of the partitioned regions are partially juxtaposed and positions of the first minute regions in the tire radial direction vary along the tire circumferential direction;
the second minute regions are positioned along the tire radial direction such that the second minute regions of adjacent ones of the partitioned regions are partially juxtaposed and positions of the second minute regions in the tire radial direction vary along the tire circumferential direction; and
the partitions separating the partitioned regions are arranged at three or more different angular intervals along the tire circumferential direction such that an interval between the partitions varies periodically along the tire circumferential direction.

8. The pneumatic tire according to claim 7, wherein
the positions of the first minute regions and the second minute regions are varied in a periodic variation in the tire radial direction such that a period and a phase of the periodic variation match a period and a phase of a periodic variation of the interval between the partitions.

9. The pneumatic tire according to claim 7, wherein
the positions of first minute regions and the second minute regions in the tire radial direction vary according to a sine wave periodic variation or a triangular wave periodic variation.

10. The pneumatic tire according to claim 7, wherein
the positions of first minute regions and the second minute regions in the tire radial direction vary according to a periodic variation having a period within a range of 10 mm to 60 mm along the tire circumferential direction.

11. A pneumatic tire comprising:
a tread portion extending in a tire circumferential direction;
a pair of sidewall sections disposed on both sides of the tread portion, respectively, with regard to a tire width direction, at least one of the sidewall sections including
a plurality of partitions comprising protrusions or grooves that are provided at a sidewall surface such that they are spaced apart in the tire circumferential direction and extend linearly in a tire radial direction to form partitioned regions at the sidewall surface;
a plurality of first minute regions that are provided in each of the partitioned regions of the sidewall surface and separated from one another along the tire circumferential direction by the partitions, and visually distinguishable from surrounding regions of the sidewall surface due to a light reflection characteristic or an unevenness of the sidewall surface; and
a plurality of second minute regions that are provided in the partitioned regions, visually distinguishable from the first minute regions due to a light reflection characteristic or an unevenness of the sidewall surface, and arranged adjacently to the first minute regions on inward and outward sides of the first minute regions along the tire radial direction;
the first minute regions and the second minute regions being provided alternately along the tire radial direction in each of the partitioned regions;
the first minute regions are positioned along the tire radial direction such that the first minute regions of adjacent ones of the partitioned regions are partially juxtaposed and positions of the first minute regions in the tire radial direction vary along the tire circumferential direction;
the second minute regions are positioned along the tire radial direction such that the second minute regions of adjacent ones of the partitioned regions are partially juxtaposed and positions of the second minute regions in the tire radial direction vary along the tire circumferential direction; and
a width of each of the partitions is within a range of 1.5 mm to 2 mm.

12. The pneumatic tire according to claim 11, wherein
the partitions separating the partitioned regions are arranged at three or more different angular intervals along the tire circumferential direction such that an interval between the partitions varies periodically along the tire circumferential direction.

13. The pneumatic tire according to claim 11, wherein
the positions of first minute regions and the second minute regions in the tire radial direction vary according to a sine wave periodic variation or a triangular wave periodic variation.

14. The pneumatic tire according to claim 11, wherein
the positions of first minute regions and the second minute regions in the tire radial direction vary according to a periodic variation having a period within a range of 10 mm to 60 mm along the tire circumferential direction.

* * * * *